United States Patent [19]

Takagi

[11] Patent Number: 4,553,717
[45] Date of Patent: Nov. 19, 1985

[54] RECORDING TAPE CARTRIDGE
[75] Inventor: Hiroyoshi Takagi, Kameoka, Japan
[73] Assignee: Hitachi Maxell, Ltd., Osaka, Japan
[21] Appl. No.: 560,870
[22] Filed: Dec. 13, 1983
[30] Foreign Application Priority Data Dec. 14, 1982 [JP] Japan ............................ 57-189807[U]

[51] Int. Cl.⁴ .......................... G03B 1/04; G11B 15/32
[52] U.S. Cl. ..................................... 242/198; 242/199; 360/132
[58] Field of Search ................ 242/55.19 A, 198–200, 242/71.2; 352/72, 78 R; 360/96.1, 132

[56] References Cited

U.S. PATENT DOCUMENTS

| | | | |
|---|---|---|---|
| 4,029,268 | 6/1977 | Schoettle et al. | 242/198 |
| 4,106,724 | 8/1978 | Higashida | 242/198 |
| 4,148,443 | 4/1979 | Lundquist | 242/55.19 A |
| 4,232,840 | 11/1980 | Sugawara | 242/198 |
| 4,288,048 | 9/1981 | Sieben | 242/198 |
| 4,447,020 | 5/1984 | Toi et al. | 242/198 |

*Primary Examiner*—Leonard D. Christian
*Attorney, Agent, or Firm*—Birch, Stewart, Kolasch & Birch

[57] ABSTRACT

A recording tape cartridge comprising a case body, tape reels for winding a recording tape and a braking mechanism for preventing rotation of the tape reels when the recording tape cartridge is not used, the braking mechanism comprising a pair of guide wall projections formed on a bottom section of the case body, a stopper member having braking members for engagement with teeth formed on flanges of the respective tape reels and being guided by the guide walls so as to move between a first position where the braking members can engage at least one of the engaging teeth of the tape reels for preventing rotation of the tape reels and a second position where the braking members are disengaged from the teeth to allow rotation of the tape reels, a spring member for resiliently biasing the stopper member toward the first position and engaging member formed by a hook like member or plate on the top portion of the guide walls so as to prevent disengagement of the stopper member from the guide walls in an upward direction.

8 Claims, 16 Drawing Figures

RECORDING TAPE CARTRIDGE

FIELD OF THE INVENTION

The present invention relates to a recording tape cartridge having an arrangement for applying a braking force to tape reels accommodated in the cartridge case.

BACKGROUND OF THE INVENTION

In a recording tape cartridge so called a video tape cassette, there is provided a braking mechanism for preventing undesired rotation of a pair of tape reels when the video cassette is not in use. The braking mechanism usually comprises stopper members which are adapted to be detachably engaged with one of the teeth formed on the circumferential edge portion of the respective flanges of the tape reels and a spring member for biassing the stopper members towards the teeth portion of the tape reels when the video cassette is not in use. In the manufacturing process of such video tape cassettes, the tape reels with a magnetic recording tape and the braking mechanism are installed in positions in a bottom section of the video cassette and subsequently a top section is assembled with the bottom section. The bottom section and the top section are joined by screws in a known manner.

Conventionally, each element of the braking mechanism is prevented from disengagement by covering the braking mechanism by a part of the top section from above when the top section is assembled with the bottom section. However, the conventional way of preventing the disengagement of the braking mechanism as described above has many drawbacks as mentioned below:

(1) On an assembly line in a manufacturing process of the video cassettes before assembling of the top section, the stopper member of the braking mechanism readily flies upward in response to even a slight vibration, whereby the stopper member is displaced from position or the free end of the stopper member is unduly placed on the upper surface of the tape reel, causing a non operative state of the braking mechanism;

(2) Relative accuracy in terms of dimension and assembly between the top section, bottom section and the braking mechanism is severe, and errors in size of each of the components interact badly thereby resulting in difficulty in correct assembling of the braking mechanism. Therefore, a non operative state of the braking mechanism may easily occur;

(3) In order to cover the upper portion of the braking mechanism, the corresponding part of the top section facing the braking mechanism must have a configuration conforming to the upper portion of the braking mechanism, so the configuration of the corresponding part of the top section is necessarily complicated; and (4) It is difficult to effect an automatic assembling of the braking mechanism in the bottom and top sections.

SUMMARY OF THE INVENTION

Therefore an essential object of the present invention is to provide an improved braking mechanism for use in a recording tape cartridge which is simple in construction and can be easily installed in the cartridge.

Another object of the present invention is to provide a braking mechanism for use in a recording tape cartridge which is not easily disengaged from position before the top section is assembled with the bottom section.

A further object of the present invention is to provide a braking mechanism for use in a recording tape cartridge which assures correct operation of the braking mechanism.

DETAILED DESCRIPTION OF THE PREFERRED EMBODIMENTS

Figure 1:
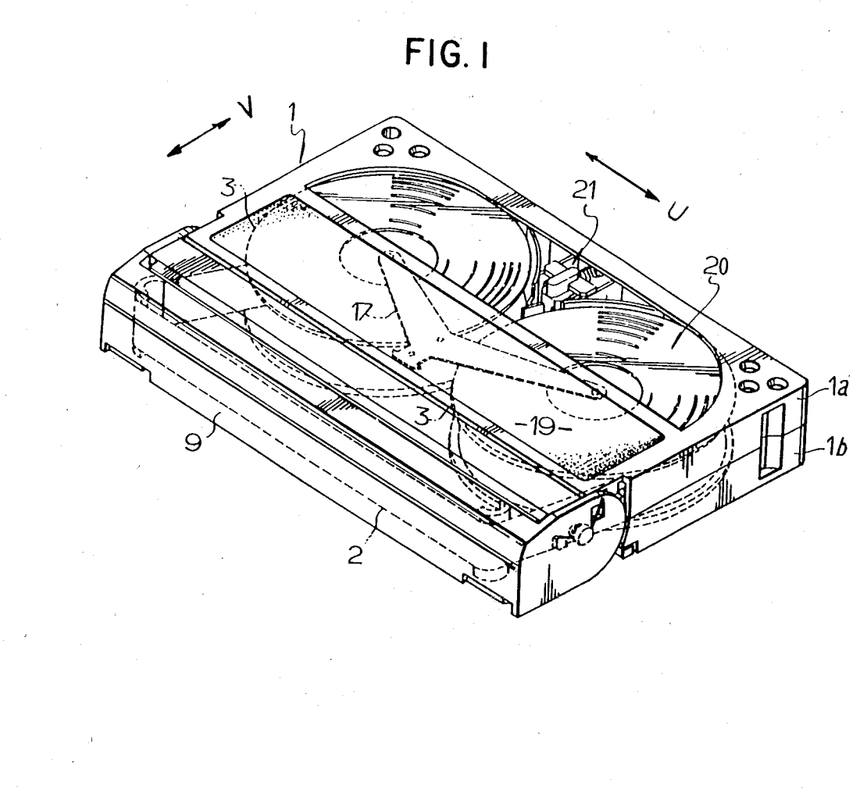
FIG. 1 is a perspective view showing an embodiment of a recording tape cartridge according to the present invention.
Figure 2:
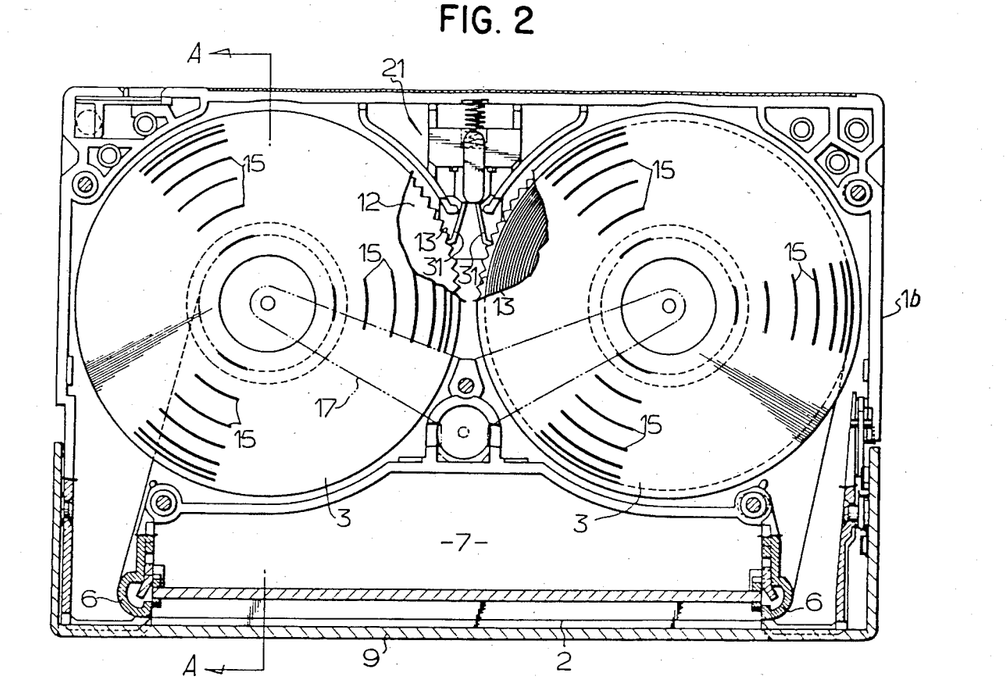
FIG. 2 is a top plan view showing the inside of the recording tape cartridge shown in FIG. 1.
Figure 3:
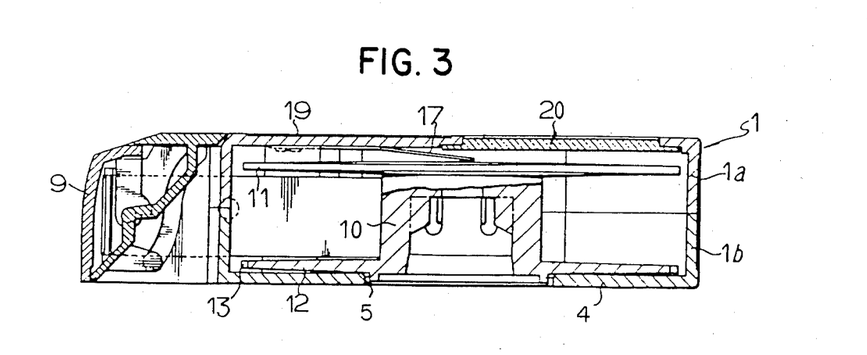
FIG. 3 is a cross sectional view taken along the lines A—A in FIG. 2.
Figure 4:
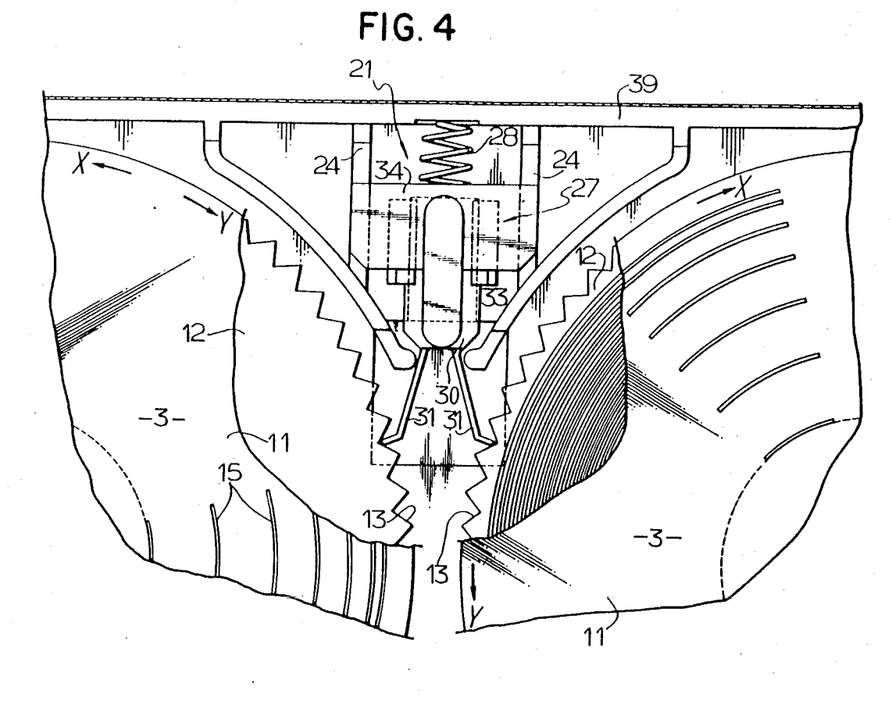
FIG. 4 is an enlarged top plan view showing an essential portion of a braking mechanism employed in the recording tape cartridge shown in FIG. 1.
Figure 5:
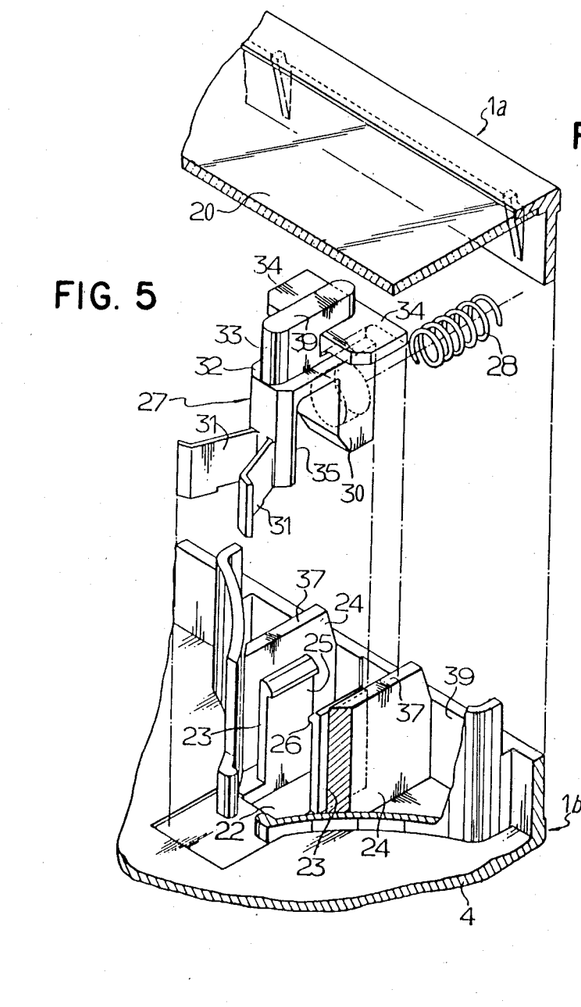
FIG. 5 is an exploded view showing an essential portion of the braking mechanism of the recording tape cartridge according to the present invention.
Figure 6:
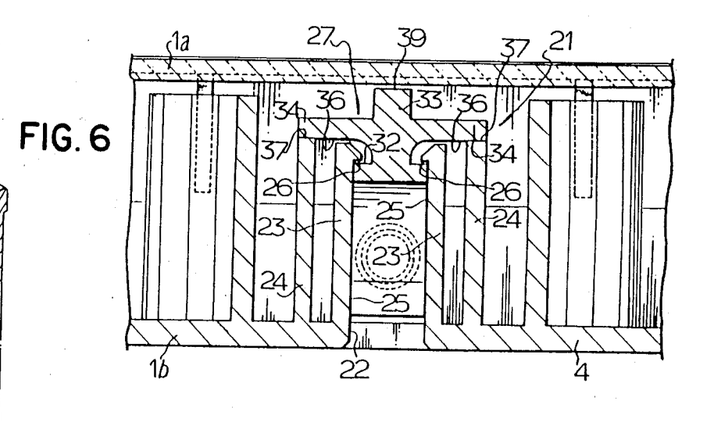
FIG. 6 is a front cross sectional view of the braking mechanism shown in FIG. 4.

Referring to FIGS. 1 to 3, there is seen a video tape cartridge for use in a small size video tape recorder, wherein a body case 1 of the recording tape cartridge is formed by assembling a top section 1a and a bottom section 1b both made of a plastic resin material. The top section 1a and the bottom section 1b are fixed together by screws. Inside the body case 1, a pair of tape reels 3 are accommodated on which a recording tape 2 is wound in a known manner. The tape reels 3 are rotatably mounted in the case body with their central portion faced to drive shaft insertion holes 5 defined on the bottom wall 4 of the bottom section 1b. A pair of tape guide members 6 are formed at both the front left portion and the front right portion of the case body 1 and the recording tape 2 is released from one of the tape reels and taken up by another tape reel passing through the tape guide members 6 and the front portion of the case body 1. A pocket 7 is defined on the front part of the case body 1 in a recessed manner for receiving from below tape drawing pins (not shown) provided on a video tape recorder.

A front lid 9 is rotatably mounted on the front portion of the case body 1 and when the video tape cartridge is not used, the front lid 9 is rotated downward to a closed position for closing the front face of the case body 1 so as to protect the recording surface of the recording tape 2 existing between the pair of tape guide members 6. When the video tape cartridge is mounted on the video tape recorder, the front lid 9 is rotated upward to open the front portion of the case body 1 so that the recording tape 2 can be drawn out of the case body 1 by the tape drawing pins of the video tape recorder entering into the pocket 7 from below.

Each of the tape reels 3 comprises a hub 10 and an upper flange 11 made of a transparent material and a lower flange 12 fixed on both of the top end and the bottom end of the hub 10. The lower flange 12 has its peripheral edge portion formed as engaging teeth 13 for engaging with a braking mechanism which will be explained later. The upper flange 11 has on its surface a plurality of calibrations or a scale 15 for recognizing the amount of roll of the recording tape 2 wound on the tape reel 3. Each of the tape reels 3 has its central axis rotatably and resiliently engaged and downwardly pressed by a free end portion of a reel pressing spring plate 17, the foot portion of which is fixed on the inner surface of the top wall of the top section 1a so that each of the tape reels 3 is rotatably supported.

On the top surface of the top section 1a, there is formed a labelling face 19 on the rear half portion of the top section 1a in a slightly recessed manner with a generally rectangular shape in plan view so that a label can be fitted on the face 19. There is defined a transparent window 20 on the front half portion of the top section for visually displaying each half portion of the tape reels 3 for recognizing the amount of recording tape wound on the respective tape reels 3. It is appreciated that the spring plate 17 having a generally V character shape is placed in a portion of the opposite side of the labelling face 19 so that the spring plate 17 is concealed but the amount of the recording tape can be recognized when the recording tape cartridge is viewed from the outside.

The braking mechanism 21 for preventing rotation of the tape reels 3 when the cartridge is not in use is mounted on the central and rear portion of and inside the case body 1.

Referring to FIGS. 4 through 7, a generally rectangular elongated through hole 22 is defined on the central portion relative to the longitudinal direction U (See FIG. 1) of the case body 1 and the rear portion of the bottom wall 4 of the bottom section 1b so as to extend frontward or in the widthwise direction V from the rear edge of the bottom section 1b. A pair of guide walls 23 project from the bottom wall 4 upward to a suitable height and extending frontward parallel to each other on both sides of the through hole 22. Each of the guide walls 23 has its top end formed as a hook member 26 projecting horizontally inwardly a predetermined length. Outside or lateral to the pair of the guide walls, a pair of support walls 24 project from the bottom wall 4 parallel with the guide walls 23. The support walls 24 are taller than the guide walls 23 so as to support a stopper member 27, as hereinafter explained.

It is desirable that the inside surfaces of the through hole 22 be flush with the inside planes 25 of the guide walls 23, so that the hook members 26 can be formed by molding without forming an undercut plane.

The braking mechanism 21 comprises the stopper member 27 and a coil spring 28 of the compression type. The stopper member 27 is made of a plastic resin material and is formed by a sliding member 30 of a generally U character shape in side view, a pair of resilient braking members 31 projecting frontward radially from the front surface of the leg of the sliding member 30 the free end portion of the braking member 31 being bent outward so as to engage with one of the teeth of the lower flange 12 of the tape reel 3, a rib 33 projecting vertically from the central portion of the top face 32 of the sliding member 30 and a pair of horizontal plates 34 projecting horizontally outwardly from the intermediate portion of the rib 33. The space defined by the two legs 35 of the sliding member 30 acts to receive a brake releasing member (not shown) of the video tape recorder when the brake releasing member enters through the through hole 22. In place of forming the sliding member 30 as a U shaped body to provide the space, the sliding member may be a cubic block having a hole for receiving the brake releasing member.

Figure 7:
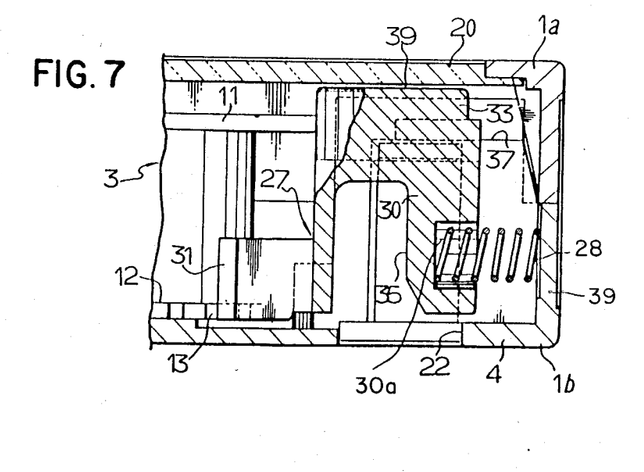
FIG. 7 is a side cross sectional view of the braking mechanism in a braking state.

The stopper member 27 is installed after the tape reels 3 are placed in position in the bottom section 1b by fitting the sliding member 30 in the space between the guide walls 23 from above, pushing the sliding member 30 downward. When fitting, the guide walls 23 can be resiliently deformed outwardly to allow the sliding member 30 to pass therebetween. When the fitting of the sliding member is completed, the lower surfaces 36 of the horizontal plates 34 are slidably supported by the top surfaces 37 of the support walls 24 so that the stopper member 27 is suspended on the support walls 24. In addition, the stopper member 27 is prevented from disengagement from the space between the guide walls 23 in the upward direction since the top surfaces 32 of the sliding member 30 are engageable with the lower faces of the hook members 26. Subsequently, the spring 28 is fitted in the space between the rear surface of the sliding member 30 and the rear vertical wall 39 of the bottom section 1b as shown in FIG. 7 so that the stopper member 27 is biassed toward the tape reels 3 by the resilient force of the spring 28. As shown in FIG. 7, one end of the spring 28 is fitted in the recess 30a formed on the rear portion of the sliding member 30.

After the stopper member 27 and the coil spring 28 and the other necessary components are assembled in the bottom section, the top section 1a is assembled with the bottom section 1b and then both sections are secured to each other by tapping screws or by way of thermal bonding. Upon assembling of the bottom section 1b and the top section 1a, the top face 39 of the rib 33 faces adjacent to the inner surface of the top wall 20 of the top section 1a, so that disengagement of the sliding member 30 from the guide walls 23 can be prevented even if the video tape cartridge is subjected to a strong vibration or impact.

The operation of the braking mechanism described above will be explained hereinafter.

In a case where the video tape cartridge is not used, the stopper member 27 is pushed frontward by the force of the spring 28 so that both of the free ends of the braking members 31 are engaged with any one of the engaging teeth of the lower flanges of the tape reels 3 so as to rotate the tape reels for taking up the tape in the direction Y and to prevent rotation of the tape reels 3 in a direction which would release the recording tape 2 from the tape reels 3, as shown by an arrow X.

When the video tape cartridge is mounted on the video tape recorder, the reel releasing member of the video tape recorder is entered in the space the through hole 22 and engaged with the sliding member 30, then the stopper member 27 is slid backward guided by the guide wall 23, so that the braking members 31 are disengaged from the engaging teeth 13 of the tape reels 3 to allow the tape reels 3 to rotate freely.

Figure 8:
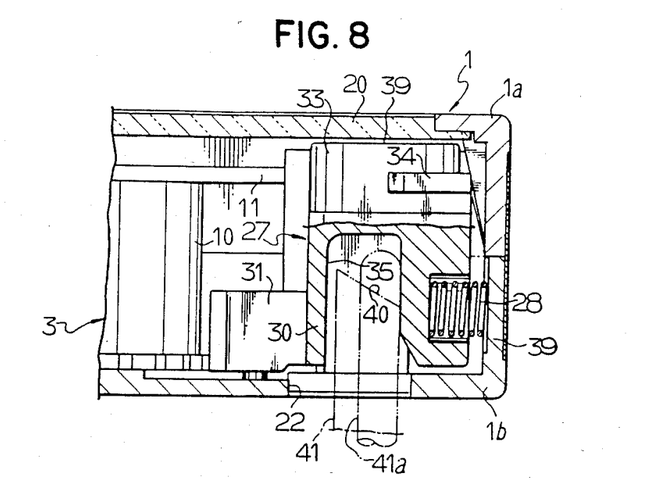
FIG. 8 is a side cross sectional view of the braking mechanism in a released state.

More specifically, in a case where the video tape recorder is provided with a reel releasing member 41, as shown in FIG. 8, fixed on the video tape recorder with the front face formed as a inclined plane 40, upon entering of the reel releasing member 41 moving upward in the space 35 through the through hole 22, the stopper member 27 is slid backward by the engagement of the inclined face 40 with the lower edge of the sliding member 30 to release the braking member 31 from the engaging teeth 13.

In a case where the video tape recorder is provided with a movable reel releasing member 41a of a round pin, upon introducing the reel releasing member 41a in the space 35, the stopper member 27 is moved backward with the movement of the reel releasing member 41a simultaneously with the movement of a tape drawing pin which draws the recording tape out of the video tape cartridge.

Figure 9:
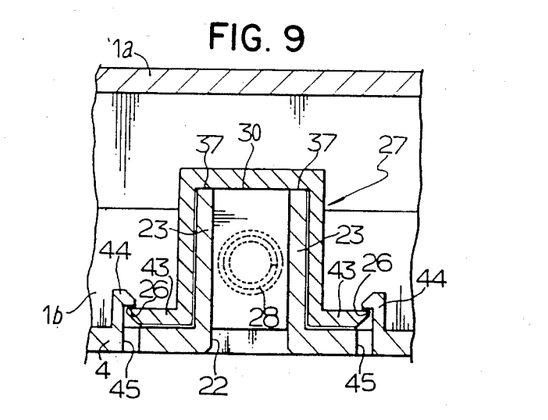
FIG. 9 is a cross sectional view of the second embodiment of the braking mechanism according to the present invention.

The second embodiment of the braking mechanism is shown in FIG. 9 wherein each of the guide walls 23 has its top end formed by flat faces 37 and the stopper member 27 is formed by a channel-like member which is fitted with the outside of the guide walls 22. The stopper member 27 is provided with engaging flanges 43 projected outward from both sides of the channel-like member as foot portions and the engaging flanges 43 are movably fitted in slots defined by the bottom wall 4 and the hook members 26 formed on the upper ends of a pair of low engaging walls 44 projected from the bottom wall 4. The lower surface of the hook members 26 can be formed by molding using a hole 45 defined in the bottom wall 4.

Figure 10:
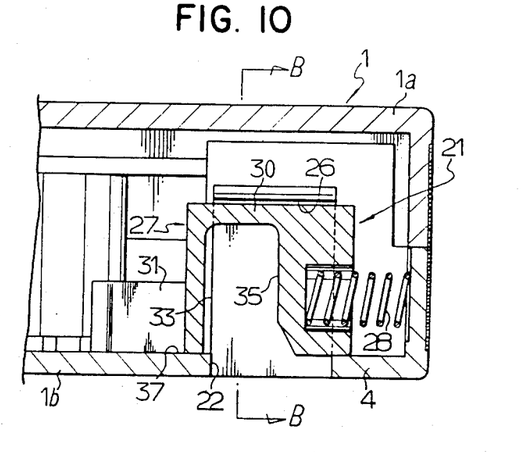
FIG. 10 is a cross sectional view of the third embodiment of the braking mechanism according to the present invention.
Figure 11:
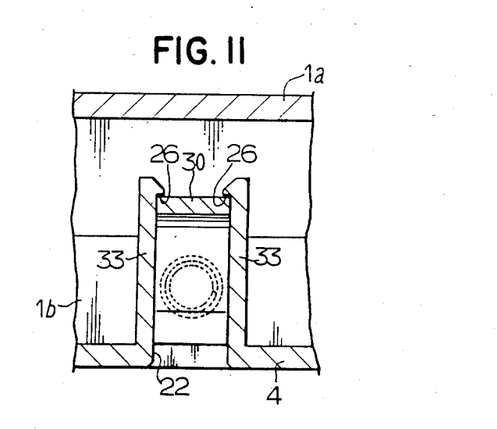
FIG. 11 is a cross sectional view taken along the lines B—B in FIG. 10.

The third embodiment of the braking mechanism is shown in FIGS. 10 and 11 wherein the rib 33 and the horizontal plates 34 are omitted from the sliding member 30 of the embodiment shown in FIGS. 4 through 7 and the lower end faces of the sliding member 30 are slidably supported on the bottom wall 4. Specifically, the length of the sliding member 30 is larger than the length of the through hole 22 in the widthwise direction of the case body and the front lower end and the rear lower end of the sliding member 30 are slidably supported on the bottom wall 4.

Figure 12:
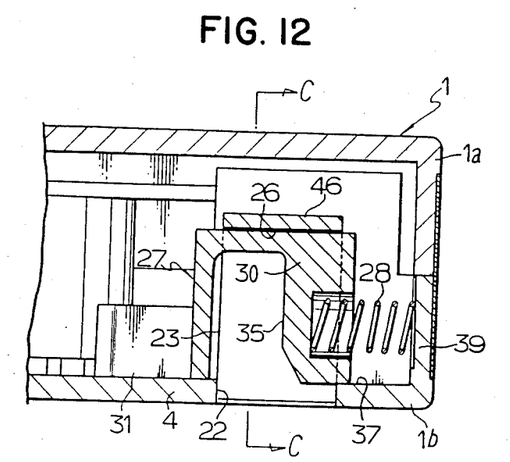
FIG. 12 is a cross sectional view of the fourth embodiment of the braking mechanism according to the present invention.
Figure 13:
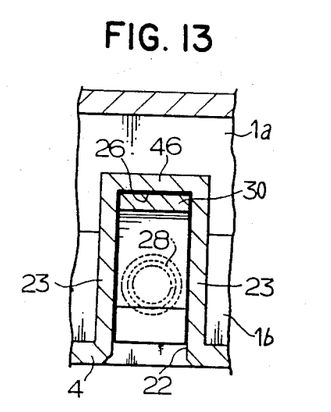
FIG. 13 is a cross sectional view taken along the lines C—C in FIG. 12.

The fourth embodiment of the braking mechanism is a modification of the third embodiment and is shown in FIGS. 12 and 13 wherein both top ends of the guide walls 23 are connected by a top plate 46. The sliding member 30 is fitted in the space surrounded by the guide walls 23 and the top plate 46 from the front side. The top plate 46 acts as the hook member for preventing disengagement of the sliding member 30.

Figure 14:
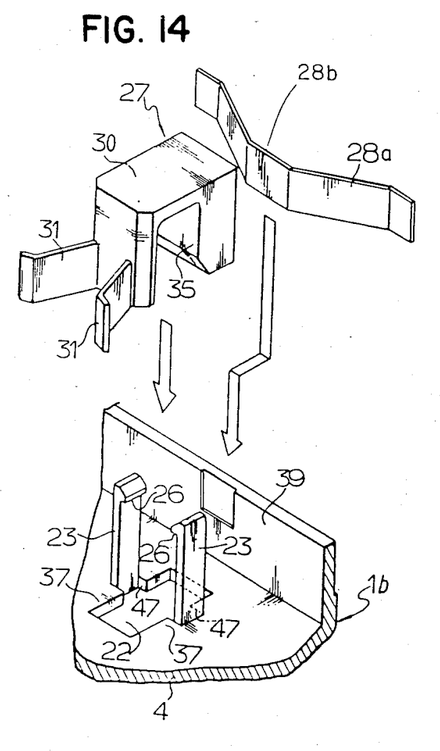
FIG. 14 is an exploded view of the fifth embodiment of the braking mechanism according to the present invention.
Figure 15:
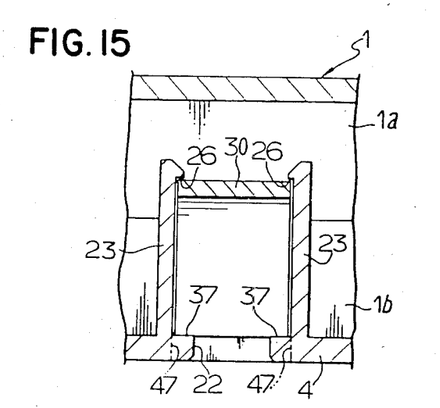
FIG. 15 is a cross sectional view of the essential portion of the braking mechanism of FIG. 14.

The fifth embodiment of the braking mechanism shown in FIGS. 14 and 15 is another modification of the third embodiment, wherein the guide walls 23 are formed at the central portion of both left and right sides of the through hole 22 with a narrower width than the guide walls shown in FIGS. 10 and 11. Furthermore, the guide walls 23 in the fifth embodiment are projected at the outward positions from the side edges of the through hole 22 defining recesses 47 at the central portion of both side edges of the through hole 22 with the distance between both of the guide walls 23 to be larger than the width of the through hole 22 and the width of the sliding member 30 is wider than the width of the through hole 22 so that when the sliding member 30 is placed between the guide walls 23, the bottom faces of both sides of the sliding member 30 being slidably supported on the bottom wall 4 forming both side edge portions of the through hole 22. By provision of the recesses 47, the hook member 26 can be molded without requiring an under cut. Furthermore, a spring plate 28a having a V configuration is used to urge the sliding member 30 frontward. The spring plate 28a is mounted in such a manner that both free ends of the spring plate 28a are engaged with the rear wall 39 of the bottom section 1a with the intermediate portion 28b engaged with the rear face of the sliding member 30.

Figure 16:
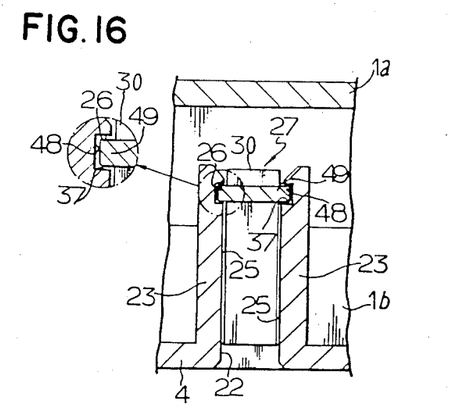
FIG. 16 is a cross sectional view of the sixth embodiment of the braking mechanism according to the present invention.

FIG. 16 shows the sixth embodiment of the braking mechanism wherein the sliding member 30 is formed with a pair of ribs 49 extending horizontally on the upper end portions of both sides. The ribs 49 are slidably engaged in slots 48 formed on the inner faces of both of the guide walls 22 so that the sliding member 30 is slidably supported in the space between the guide walls 22 and is prevented from disengagement from the guide walls 22. In a case where the slots 48 are formed at the level higher than the height of the rear wall 39 of the bottom section 1b the slots 48 can be molded using sliding cores.

In the sixth embodiment, the ribs 49 may be formed on the guide walls 22 forming the slots 48 on both sides of the sliding member 30. In this case, when molding, by forming the upper face of the ribs by an upper die and the lower face by a lower die through the hole 22, occurrence of the under cut may be effectively prevented.

Throughout the various embodiments, in place of the stopper member 27 having two braking members 31, two stopper members each having a single braking member 31 can be used. In this case, the stopper members are separately placed on both corners of the bottom section 1b.

In place of the spring 28, the stopper member 27 may be provided with a resilient member formed integrally with the stopper member so that the resilient member acts to urge the stopper member toward the tape reel.

Furthermore, the configuration of the spring plate 17 for supporting the tape reels is not limited to that shown in FIG. 1. Also the transparent window 20 may be separated. Also it is noted that the recording tape cartridge according to the present invention is not limited to the video tape cartridge shown in the above mentioned embodiments and can be applied to various types of recording tape cartridges.

The invention being thus described, it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. A recording tape cartridge which comprises a bottom section, a top section assembled with the bottom section to form a case body, at least one tape reel accommodated in said case body with a recording tape wound therearound, each of said tape reels having at least one flange with its peripheral edge formed as engaging teeth, an opening defined in the bottom section for allowing entrance of a tape reel releasing member provided on a tape recording apparatus and tape reel braking means for preventing rotation of said tape reel when said recording tape cartridge is not in use, said tape reel braking means comprising a pair of guide wall projections formed at both sides of said opening in said bottom section forming a space therebetween, a stopper member having at least one braking member for engagement with any one of the teeth of said tape reel and being guided by said guide walls so as to move between a first position where said braking member can engage at least one of the engaging teeth of said tape reel for preventing rotation of said tape reel and a second position where said braking member is disengaged from said teeth to allow rotation of said tape reel, means for resiliently biassing said stopper member toward said first position and an engaging means for preventing disengagement of said stopper member from said guide walls in an upward direction.

2. The recording tape cartridge according to claim 1, wherein said stopper member is formed by a sliding member, slidably accommodated in said space between said guide walls, having two leg portions and a top portion connected with both leg portions to form a generally U character shape, a rib projected from a top face of said sliding member, a pair of horizontal plates projected horizontally from an intermediate portion of said rib, each horizontal plate being terminated by a free end, and a pair of braking members projected from one surface of one leg portion of said sliding member, said guide walls being provided with hook like members projecting from top ends of said walls toward said space whereby said stopper member is arranged in such a manner that said sliding member is accommodated in said space between said guide walls with said rib and horizontal plates situated above a top face of the guide walls with the braking members directed toward the tape reels, and each free end portion of said horizontal plates being slidably supported on top faces of a pair of support walls formed outside said guide walls so that said stopper member is suspended by said horizontal plates and said support walls and the disengagement of said stopper member is prevented by said hook like members.

3. The recording tape cartridge according to claim 1, wherein said engaging means is formed by a plate member bridged across two top ends of said guide walls and said stopper member has a generally U character shape and is slidably accommodated in said space between said guide walls whereby disengagement of said stopper member is prevented by said plate member.

4. The recording tape cartridge according to claim 1, wherein said engaging means comprises a pair of hook like members projected from each of said guide walls toward said space and said stopper member is accommodated in said space so that disengagement of said stopper member is prevented by said hook like members.

5. The recording tape cartridge according to claim 1, wherein said engaging means comprises a pair of hook like members formed on a pair of walls projected from a bottom section outside said guide walls and said stopper member is formed by a channel-like member having a pair of flanged portions projected outward from bottom portions of said channel-like member whereby said stopper member is so engaged with said guide walls that said channel-like member slidably covers an outside of each of said guide walls with each of said flanged portions of said channel-like member fitted in a space defined by said bottom section and one of said hook like members so that said stopper member is prevented from disengagement from said guide walls by said hook like member.

6. The recording tape cartridge according to claim 1, wherein said guide walls project on both sides of said opening with a distance therebetween being larger than the distance between both side edges of said opening, having a pair of hook like members on top portions of each of said guide walls and said stopper member is accommodated between said guide walls with the bottom face of said stopper member slidably supported on peripheral edge portions of said bottom section defining said opening whereby disengagement of said stopper member is prevented by said hook like portion of said guide walls.

7. The recording tape cartridge according to claim 1, wherein said engaging means comprises slot means with a projection means slidably engaging with said slot means formed on said guide walls and said stopper member.

8. The recording tape cartridge according to claim 2, wherein said tape reel braking means is disposed between two tape reels adjacent to a rear wall member of said bottom section with each of said braking means being engageable with the teeth portion of said corresponding tape reels and said resilient means is a coil spring fitted between a rear face of said stopper member and said rear wall of said bottom section.

* * * * *